(12) United States Patent
Kadowaki

(10) Patent No.: US 6,654,873 B2
(45) Date of Patent: *Nov. 25, 2003

(54) PROCESSOR APPARATUS AND INTEGRATED CIRCUIT EMPLOYING PREFETCHING AND PREDECODING

(75) Inventor: Tomohiko Kadowaki, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/479,570

(22) Filed: Jan. 7, 2000

(65) Prior Publication Data

US 2003/0182535 A1 Sep. 25, 2003

(30) Foreign Application Priority Data

Jan. 11, 1999 (JP) .......................... P11-004398

(51) Int. Cl.[7] .............................. G06F 15/00; G06F 9/30
(52) U.S. Cl. ........................................ 712/207; 712/213
(58) Field of Search .............................. 712/213, 207, 712/235

(56) References Cited

U.S. PATENT DOCUMENTS 5,634,025 A * 5/1997 Breternitz, Jr. ............. 712/207
5,664,135 A * 9/1997 Schlansker et al. ......... 712/201
5,729,707 A * 3/1998 Maki .......................... 712/207
5,961,632 A * 10/1999 Shiell et al. ................. 712/11
6,061,786 A * 5/2000 Witt ............................ 712/237

FOREIGN PATENT DOCUMENTS

JP    362011939 A  * 7/1985  ............. G06F/9/38

OTHER PUBLICATIONS

Microsoft Press®. Microsoft Press® Computer Dictionary Second Edition. Redmond, Washington: Microsoft Press, ©1994. Pp. 228 and 248.*

* cited by examiner

Primary Examiner—Eddie Chan
Assistant Examiner—Aimee J. Li
(74) Attorney, Agent, or Firm—Frommer Lawrence & Haug LLP; William S. Frommer; Glenn F. Savit

(57) ABSTRACT

A processor apparatus which reduces an overhead at the time of switching processing modules and efficiently performs desired processing at a high speed, wherein desired processing is performed by prefetching a series of instructions by a main program prefetcher, pre-decoding the same by a pre-decoder, and supplying the same to a decoder and execution unit via a multiplexer. When an instruction to execute a macro command is detected in the pre-decoder, the instructions of the macro command are prefetched by a macro program prefetcher and pre-decoded in the pre-decoder. As a result, when branching to a macro command, the instructions of the macro command can be immediately supplied to an execution unit only by switching the multiplexer.

6 Claims, 4 Drawing Sheets

PROCESSOR APPARATUS AND INTEGRATED CIRCUIT EMPLOYING PREFETCHING AND PREDECODING

BACKGROUND OF THE INVENTION

1. Field of the Invention

The present invention relates to a processor apparatus for performing desired processing in accordance with a program, more particularly a processor apparatus which can eliminate an overhead at the time of branching and returning of processing to a program module of a lower hierarchy, such as a macro command program, and can efficiently perform desired processing at a high speed, and to an integrated circuit such as an application-specific IC built in such a processor apparatus.

2. Description of the Related Art

In a so-called microprocessor unit (MPU) (hereinafter, also simply referred to as a processor) for performing desired processing in accordance with a program, a variety of high speed architectures have been developed and operating frequencies made to higher in recent years. Processing speeds have consequently become much faster.

Also, along with advances made in semiconductor technology, it has become relatively easy to form a desired circuit including a processor on a single semiconductor circuit (IC). So-called application-specific ICs (ASIC) capable of efficiently performing desired processing at a high speed by an exclusive circuit including a processor and specifically optimized for the processing have been developed and put into use.

In such processors, however, the processing speeds of the buses and peripheral circuits for supplying programs and data to the processors have fallen behind the processing speeds of the processors resulting in the so-called bus-neck or memory-neck state. As a result, the processing ability of the processors cannot be fully used.

Therefore, attempts have been made to improve the efficiency of execution of programs by providing a large number of pre-fetch queues and instruction caches etc. for, for example, reading in advance the programs.

Summarizing the problem to be solved by the present invention, even in such a processor, for example, when a branch instruction appears, the pre-fetched program cannot be used and it becomes necessary to newly fetch the branched program, so there is a disadvantage that the processing of the processor is kept waiting and therefore the processing efficiency declines.

Recently, especially, there have been many programs of a hierarchical structure making liberal use of functions, subroutines, macro commands, etc., with the actual execution program level being the functions. When executing such a program, it is necessary to transfer control of processing between a main program and a lower level processing module or between a processing module and further lower level processing module, so an overhead arises at that time. This has been an obstacle in improving the processing efficiency.

SUMMARY OF THE INVENTION

An object of the present invention is to provide a processor apparatus which can eliminate the overhead at the time when a branch condition arises or switching of a processing module occurs and can more efficiently perform the desired processing.

Another object of the present invention is to provide an integrated circuit having such a processor capable of efficiently performing desired processing at a high speed.

To attain the above objects, according to a first aspect of the present invention, there is provided a processor apparatus comprising a plurality of prefetching means for successively prefetching a series of instructions; a plurality of pre-decoders provided corresponding to the plurality of prefetching means and for detecting from the series of prefetched instructions an instruction by which at least a processing order becomes discontinuous; a prefetching control means for making another prefetching means, different from a prefetching means corresponding to a pre-decoder detecting an instruction by which the processing order becomes discontinuous, prefetch a new series of instructions which is not continuous with the series of instruction; a selection means for successively selecting pre-decoders having instructions to be executed from the plurality of pre-decoders and successively reading the instructions; and a processor means for executing predetermined processing in accordance with the read instructions.

In the processor apparatus configured as above, a series of instructions in an execution program are successively prefetched by one of the prefetch means, pre-decoded in a corresponding pre-decoder, and supplied to a processor means via a selection means where the desired processing is performed. At this time, when an instruction by which at least the processing order becomes discontinuous is detected in a pre-decoder, a new series of instructions based on the instruction are successively prefetched by another prefetch means and pre-decoded in a pre-decoder. When branching occurs due to the execution of an instruction, a new series of instructions are immediately supplied to the processor means only by switching the pre-decoder by the selection means.

According to a second aspect of the present invention, there is provided an integrated circuit comprising a first prefetching means for successively prefetching a series of instructions comprising a main program for executing desired processing while suitably calling up program modules; a plurality of second prefetching means for successively prefetching a series of instructions comprising a plurality of the program modules for respectively performing predetermined processing; a plurality of pre-decoders provided corresponding to the first prefetching means and the plurality of second prefetching means for detecting an instruction to call up at least the program modules from the series of prefetched instructions; a prefetching control means for making another prefetching means, different from a prefetching means corresponding to a pre-decoder detecting an instruction to call up the program modules, prefetch the called up new program modules; a selection means for successively selecting pre-decoder having instructions to be executed from the plurality of pre-decoders and successively reading the instructions; and a processor means for executing predetermined processing in accordance with the read instructions.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments will be described with reference to the accompanying drawings.

An embodiment of a processor apparatus of the present invention will be explained with reference to FIGS. 1 and 2.

Figure 1:
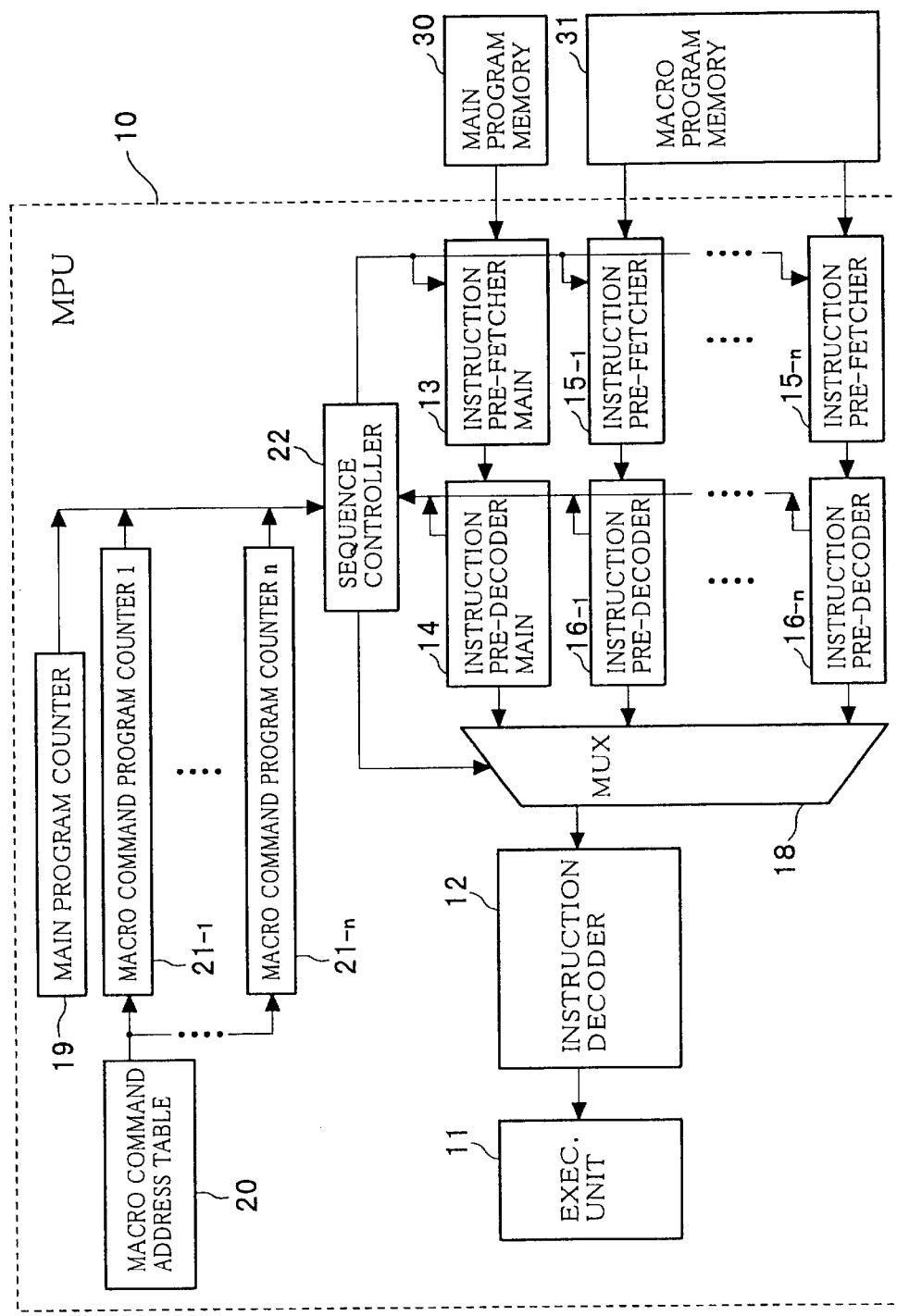
FIG. 1 is a block diagram of the configuration of a processor apparatus according to an embodiment of the present invention.

FIG. 1 is a block diagram of the configuration of the processor apparatus of the present invention.

A processor 10 comprises an execution unit 11, an instruction decoder 12, a main program instruction prefetcher 13, a main program instruction pre-decoder 14, n number of macro program instruction prefetchers $15_{-1}$ to $15_{-n}$, n number of macro program instruction pre-decoders $16_{-1}$ to $16_{-n}$, a multiplexer 18, a main program counter 19, a macro command address table 20, n number of macro command program counters $21_{-1}$ to $21_{-n}$, and a sequence controller 22.

Note that FIG. 1 shows the processor apparatus 10 in the state of being connected to a main program memory 30 for storing the main program of the program to be processed and a macro program memory 31 for successively storing macro block programs.

First, the structure of the respective components will be explained.

The execution unit 11 is a processing portion for actually performing the desired processing in accordance with an instruction supplied from the instruction decoder 12 with respect to the supplied data to be processed.

The instruction decoder 12 further decodes the instruction data which is pre-decoded and supplied in the main program instruction pre-decoder 14 or in the macro program instruction pre-decoder $16_{-i}$ (i=1 to n) selected by the multiplexer 18, which will be explained later on. The instruction decoder 12 generates a control code which is output to the execution unit 11 so that the execution unit 11 performs the desired processing based on the instruction data.

The main program instruction prefetcher 13 successively reads instruction data of steps of the main program from the externally provided main program memory 30 storing the main program based on an address data and a control signal input from the sequence controller 22 and outputs it to the main program instruction pre-decoder 14.

The main program instruction pre-decoder 14 pre-decodes the instruction data input from the main program instruction prefetcher 13 and outputs it to the instruction decoder 12 via the multiplexer 18. At this time, when "a macro command" instruction is decoded, the main program instruction pre-decoder 14 outputs a signal indicating that to the sequence controller 22.

The n number of macro program instruction prefetcher $15_{-1}$ to $15_{-n}$ each successively reads the instruction data of the steps of the macro program from the externally provided macro program memory 31 storing the macro program based on address data and a control signal input from the sequence controller 22 and outputs it to the corresponding macro program instruction pre-decoder 16.

The n number of macro program instruction pre-decoders $16_{-1}$ to $16_{-n}$ each pre-decodes the instruction data input from the corresponding macro program instruction prefetcher $15_{-i}$ and outputs it to the instruction decoder 12 via the multiplexer 18. At this time, when "a macro command" instruction is decoded, the macro program instruction pre-decoder $16_{-i}$ outputs a signal indicating that to the sequence controller 22. Also, when the instruction of "a macro command" being pre-decoded is completed, the macro program instruction pre-decoder $16_{-i}$ outputs a signal indicating that to the sequence controller 22.

The multiplexer 18 selects the instruction data being pre-decoded as an output signal of the main program instruction pre-decoder 14 and one of the n number of macro program instruction pre-decoders $16_{-1}$ to $16_{-n}$ based on the control signal from the sequence controller 22 and outputs it to the instruction decoder 12.

The main program counter 9 is involved in the execution of the main program and is a program counter for controlling a program read from the main program memory 30.

The macro command address table 20 is a table for storing top addresses of starting executions of the macro command programs stored in the macro program memory 31. The n number of macro program counters $21_{-1}$ to $21_{-n}$ properly read the top addresses.

Each of the n number of macro command program counters $21_{-1}$ to $21-n$ is engaged in the execution of a macro command program of a corresponding level and is a program counter for controlling programs to be read from the macro program memory 31.

The sequence controller 22 is a control portion for controlling the components involved mainly in the above instruction fetching and decoding of the processor apparatus 10 in order that the execution unit 11 be suitably provided with instruction codes and a desired operation can be efficiently executed.

Specifically, for example, when a signal indicating that a "macro command" is decoded is input from the main program instruction pre-decoder 14 or a macro program instruction pre-decoder $16_{-j}$ (j=1 to n), the sequence controller 22 controls the macro program counter $21_{-i}$ of a level corresponding to the "macro command" (i=1 when branching from the main program, while, i=j+1 when branching from the macro command program) to read a top address of starting the "macro command" from the macro command address table 20. Then, based on a program counter value counted by the macro command program counter $21_{-i}$, the sequence controller 22 controls a predetermined macro program instruction prefetcher $15_{-1}$ corresponding to the "macro command" in the n number of macro program instruction prefetchers $15_{-1}$ to $15_{-n}$ in order to successively access the macro program memory 31 and prefetch the programs.

Furthermore, at this time, the sequence controller 22 stops while storing as the content up to then the prefetching and decoding processing in the main program instruction prefetcher 13 and the main program instruction pre-decoder 14 corresponding to the main program and macro program which have been mainly executed up to then or the macro program instruction prefetcher $15_{-j}$ and the macro program instruction pre-decoder $16_{-j}$.

Then, when the newly started processing of the "macro command" is completed, the sequence controller 22 immediately makes the prefetching and pre-decoding processing restart from the suspended state.

Also, the sequence controller 22 suitably switches the multiplexer 18 along with switching of the components for performing the prefetching and pre-decoding in order that validated pre-decoding results be properly input to the instruction decoder 12.

Also, when executing the main program and macro commands, the sequence controller 22 controls the main program instruction prefetcher 13 and the macro program instruction prefetcher $15_{-i}$ based on the program count value input from the main program counter 19 or a macro command program counter $21_{-i}$ in order that the programs stored in the main program memory 30 and the macro program memory 31 be successively read.

Next, the operation of the processor apparatus 10 will be explained with reference to FIG. 2.

Note, here, the operation of the processor apparatus 10 will be explained by an example of a structure having only one level of macro command programs. Accordingly, the explanation of operations of calling up another macro command program from a macro command program will be omitted.

First, when normally starting the processing, the main program counter 19 is reset to the 0-address. Based on this, the main program instruction prefetcher 13 successively accesses the main program memory 30 from the 0-address and prefetches the stored program codes.

The prefetched program codes are successively pre-decoded in the main program instruction pre-decoder 14. When an instruction is a regular instruction, it is input to the instruction decoder 12 via the multiplexer 18, decoded, and executed in the execution unit 11.

When the instruction pre-decoded in the main program instruction pre-decoder 14 is one showing a "macro command", that fact is input to the sequence controller 22. Under the control of the sequence controller 22, the top address of starting the macro program corresponding to the "macro command" is read from the macro command address table 20 to the macro command program counter $21_{-i}$ (i=1 in this example).

Then, based on an output of the macro command program counter $21_{-i}$, the similarly corresponding macro program instruction prefetcher $15_{-i}$ prefetches the program code of the macro command stored in the macro program memory 31, and the macro program instruction pre-decoder $16_{-i}$ pre-decodes the same.

At the timing of performing processing for calling up the macro command of the main program, the multiplexer 18 is switched and the program code of the macro command pre-decoded in the macro program instruction pre-decoder $16_{-i}$ is supplied to the instruction decoder 12.

As a result, the execution unit 11 moves from execution of the main program to the macro command. Note that, at this time, the content of a condition flag and the main program counter 19 are saved as they are.

When the program code of the macro command is completed, that fact is detected in the macro program instruction pre-decoder $16_{-i}$ and the sequence controller 22 switches the execution program from the macro command to the main program. Namely, the multiplexer 18 is switched, an output of the main program instruction pre-decoder 14 is output to the instruction decoder 12, the main program counter 19 starts to count again, and the main program instruction prefetcher 13 starts to prefetch program codes of the main program again based on the counter value.

After this, in the same way, every time a macro command is decoded, prefetching and decoding of the program of the macro command are performed in the macro program instruction prefetcher $15_{-1}$ and the macro program instruction decoder $16_{-1}$, which are different from the main program instruction prefetcher 13 and the main program instruction pre-decoder 14, then object of execution by the execution unit 11 is switched by switching the multiplexer 18.

Figure 2:
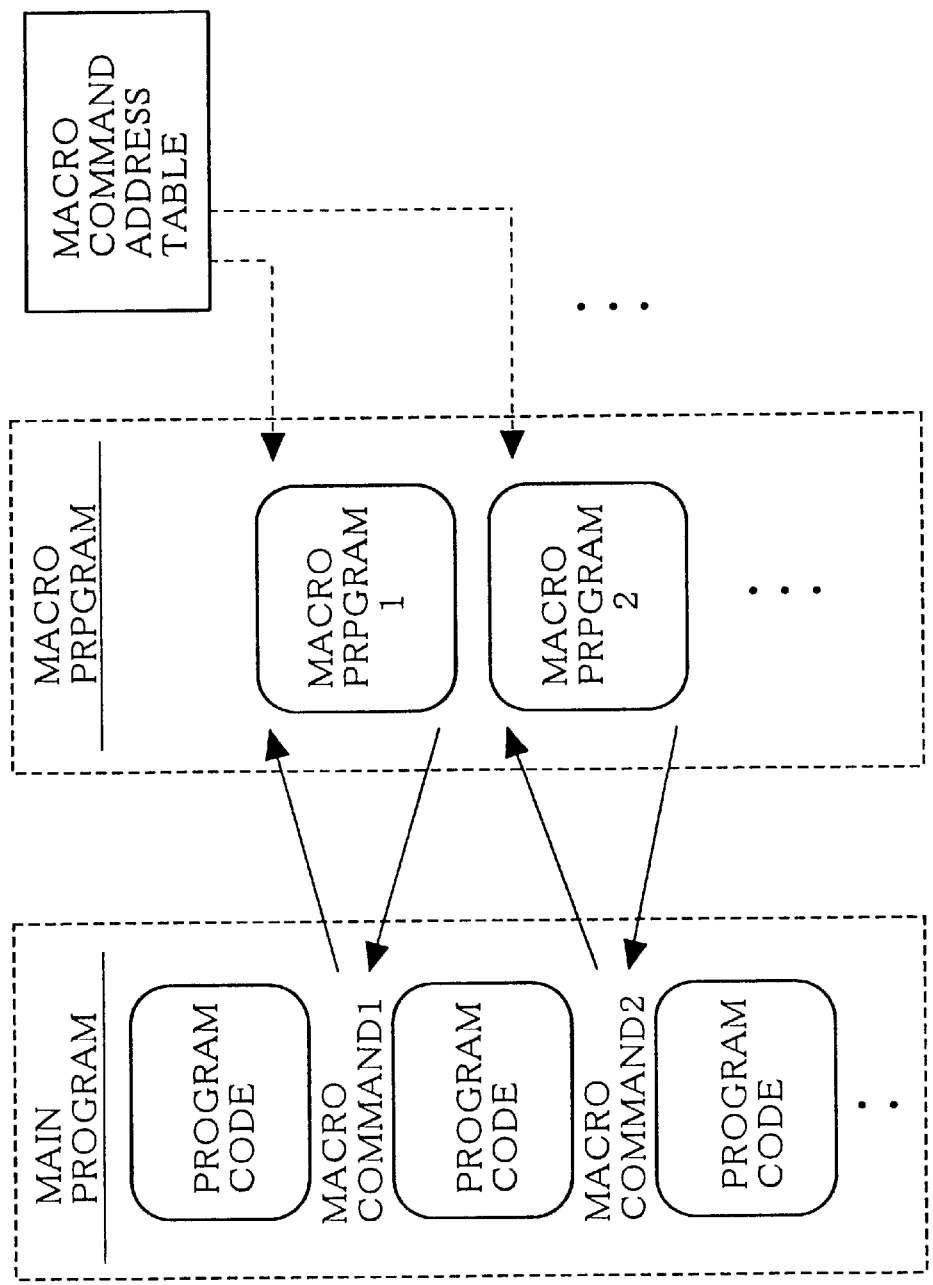
FIG. 2 is a view of a program execution state in the processor apparatus of FIG. 1.

Though not shown in FIG. 2, note that also when a further macro command arises during operation in accordance with a macro command program, prefetching and pre-decoding of the new lower level macro command is performed in the same way as above, and control for the execution unit 11 is switched by switching the multiplexer 18. Also, the original program is returned to by successively switching the multiplexer 18 to successively return level by level.

As explained above, in the processor apparatus 10 of the present embodiment, since a plurality of prefetchers, pre-decoders, and program counters are provided separately for a main program and macro commands, it is not necessary to save a prefetched program code and program counter value even when branching or calling up another processing module during program execution. It is sufficient to simply switch program codes to be output to the instruction decoder 12 and the execution unit 11. Therefore, the overhead which had occurred at the time of saving data can be eliminated, such branching and callup can be performed immediately, the execution speed is not lowered even if a branch instruction is frequently used, and the processing speed and processing efficiency as a whole can be largely improved.

Note that the present invention is not limited to the above embodiment. A variety of modifications can be made.

For example, the processor of the present embodiment was configured with both the main program memory and the macro program memory provided as external memories, however, part or all of the two may be provided inside the processor apparatus as well. Also, the configuration of the memories for storing the programs may be freely determined.

For example, a main program and a macro program may be mapped in the physically same memory.

Of course, the main program memory and the macro program memory can be realized by using physically different memories as well.

Figure 3:
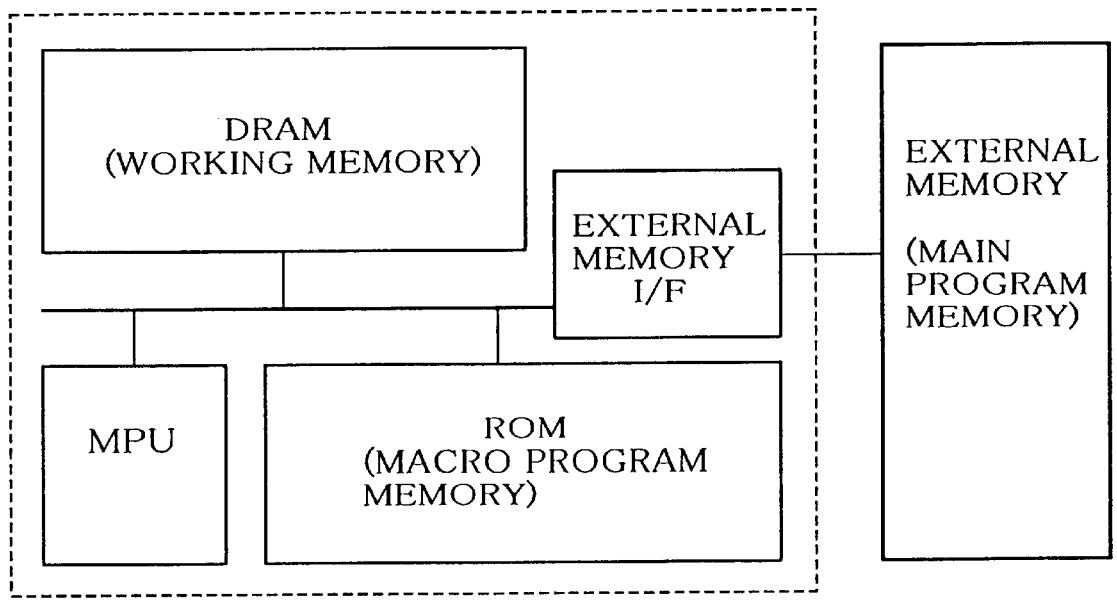
FIG. 3 is a first view of another example of the configuration of the processor apparatus of the present invention.

In that case, for example, as shown in FIG. 3, it is possible to have the main program memory provided as an external memory and the macro program memory provided as a mask ROM inside the processor apparatus. Writing the actual content of data processing mainly in macro programs and writing only the overall sequential order in the main program is preferable because the processing speed can be improved and, in addition, the main program can be easily corrected.

Figure 4:
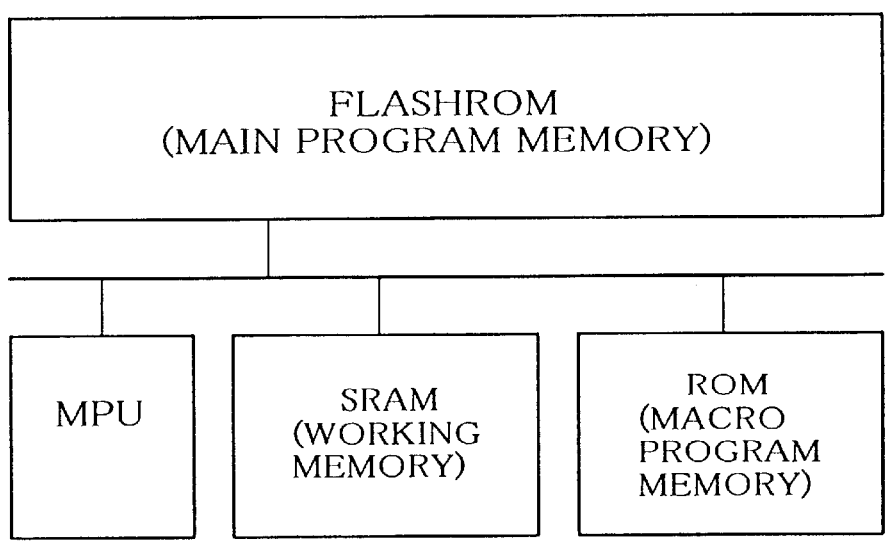
FIG. 4 is a second view of another example of the configuration of the processor apparatus of the present invention.

Also, the main program memory shown in FIG. 3 may be housed in the processor apparatus by using a flash memory and an EEPROM as shown in FIG. 4. By doing so, it becomes possible to rewrite the main program and, in addition, to form everything on a single chip. This is also economically efficient.

Figure 5:
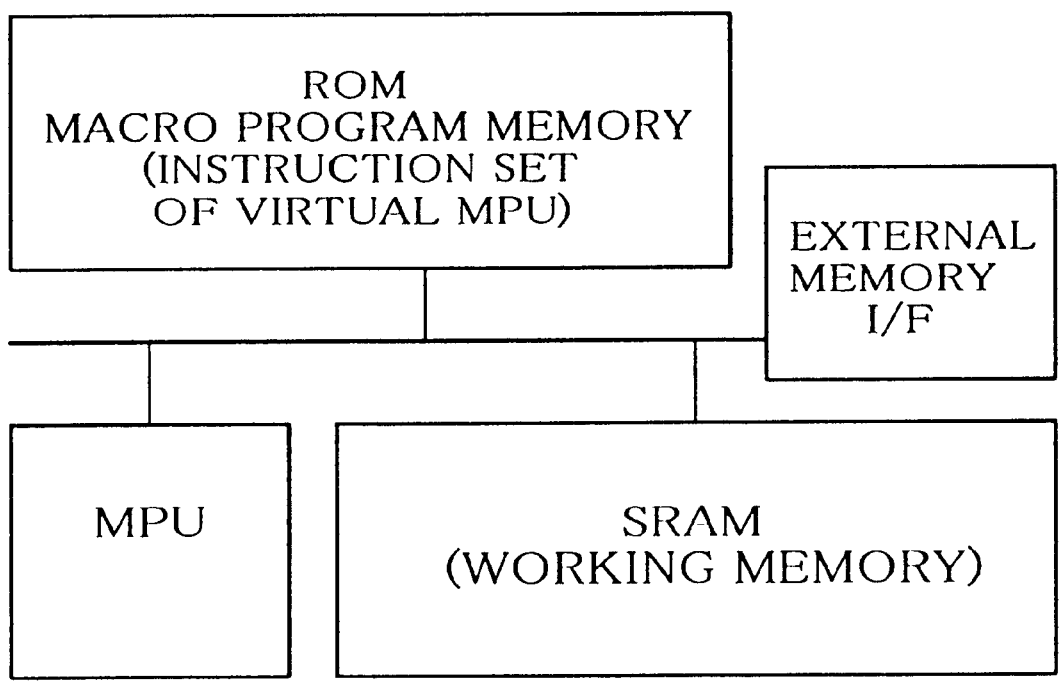
FIG. 5 is a third view of another example of the configuration of the processor apparatus of the present invention.

Also, as shown in FIG. 5, when the content of a macro program to be stored in a ROM inside the processor apparatus is theoretically in a one-to-one correspondence with a specified MPU instruction set, it is possible to configure a virtual MPU emulator (virtual machine). The present invention can be implemented by such a configuration.

Furthermore, it was explained in the present embodiment that when an instruction for calling up another program module such as a function, sub-routine, or macro command is found in an instruction being executed, the program module is prefetched by another prefetcher. However, this may also be applied to regular branching in the same program module. At this time, it is sufficient to prefetch an instruction from the branching destination by another prefetcher, control the multiplexer 18 based on the branching condition of the results of the execution results, and select an instruction of the original program or an instruction from the separately prefetched branching destination.

Summarizing the effect of the present invention, as explained above, according to the present invention, it is possible to provide a processor apparatus capable of decreasing an overhead at the time of a branching condition or switching of processing modules and of efficiently performing desired processing.

Also, it is possible to provide an integrated circuit capable of efficiently performing desired processing at a high speed.

While the invention has been described with reference to specific embodiment chosen for purpose of illustration, it should be apparent that numerous modifications could be made thereto by those skilled in the art without departing from the basic concept and scope of the invention.

What is claimed is:

1. A processing apparatus comprising:
    a plurality of prefetching means, each for prefetching a series of instructions, said plurality of prefetching means comprising a primary prefetching means for successively prefetching instructions of a main program for executing processing and calling up program modules, and a plurality of additional prefetching means for prefetching instructions of a plurality of said program modules for performing predetermined processing operations;
    a plurality of pre-decoders corresponding to said plurality of prefetching means, each configured to detect, from said series of prefetched instructions fetched by the corresponding prefetching means, an instruction by which at least a processing order becomes discontinuous, and providing a detection signal indicative of said detection;
    prefetching control means for causing, in response to said detection signal from a first pre-decoder corresponding to a first of said plurality of pre-fetching means, a second one of said plurality of prefetching means to prefetch a new series of instructions which is not continuous with a first series of instructions detected by said first pre-fetching means, wherein said prefetching control means causes said second prefetching means to prefetch a called up new program module when said first pre-decoder detects an instruction to call up a program module;
    selection means for successively selecting pre-decoders having instructions to be executed from said plurality of pre-decoders and successively reading the instructions; and
    processing means for executing predetermined processing in accordance with said read instructions;
    first memory means for storing said main program:
    second memory means for storing said plurality of program modules; wherein,
        said primary prefetching means successively prefetches said instructions of said main program from said first memory means;
        said plurality of additional prefetching means prefetches said instructions of said program modules from said second memory means;
        said plurality of additional prefetching means are arranged to correspond to said plurality of program modules stored in said second memory means;
        said prefetching control means causes a said additional prefetching means corresponding to a said program module to be newly called up, to prefetch the program module; and
    said processing apparatus further comprising:
        a plurality of program counters corresponding to said plurality of prefetching means; and
        a table having address information of each of said plurality of program modules in said second memory means;
        wherein each of said plurality of program counters determines an initial value by referring to said table at the time of prefetching said corresponding program modules.

2. The processing apparatus of claim 1, wherein:
   said first memory means is a freely rewritable memory means; and
   said second memory means is composed of a read only memory (ROM).

3. An integrated circuit comprising:
   first prefetching means for successively prefetching a series of instructions comprising a main program for executing desired processing, and calling up program modules;
   a plurality of second prefetching means, each for prefetching a series of instructions of a program module stored in memory;
   a plurality of pre-decoders, each corresponding to one of said first prefetching means or said plurality of second prefetching means, each for detecting an instruction to call up at least a program module from said series of prefetched instructions, and providing a signal indicative of said detection;
   prefetching control means for causing, in response to said detection signal from a pre-decoder that corresponds to a given one of said first and second prefetching means, another one of said second prefetching means to prefetch a new program module which is different from a program module prefetched by said given prefetching means;
   selection means for successively selecting a pre-decoder having instructions to be executed from said plurality of pre-decoders and successively reading the instructions;
   processing means for executing predetermined processing in accordance with said read instructions;
   first memory means for storing said main program;
   second memory means for storing said plurality of program modules; wherein,
       said primary prefetching means successively prefetches said instructions of said main program from said first memory means;
       said plurality of second prefetching means prefetches said instructions of said program modules from said second memory means;
       said plurality of second prefetching means are arranged to correspond to said plurality of program modules stored in said second memory means;

said prefetching control means causes a said second prefetching means corresponding to a said program module to be newly called up, to prefetch the program module; and said integrated circuit further comprising:
 a plurality of program counters corresponding to said plurality of prefetching means; and
 a table having address information of each of said plurality of program modules in said second memory means;
 wherein each of said plurality of program counters determines an initial value by referring to said table at the time of prefetching said corresponding program modules.

4. The integrated circuit of claim 3 wherein said program modules are macro programs.

5. The integrated circuit of claim 3, wherein said program module storing means is a ROM (read only memory).

6. The integrated circuit of claim 3, wherein said main program memory means is a flash ROM.

* * * * *